UNITED STATES PATENT OFFICE.

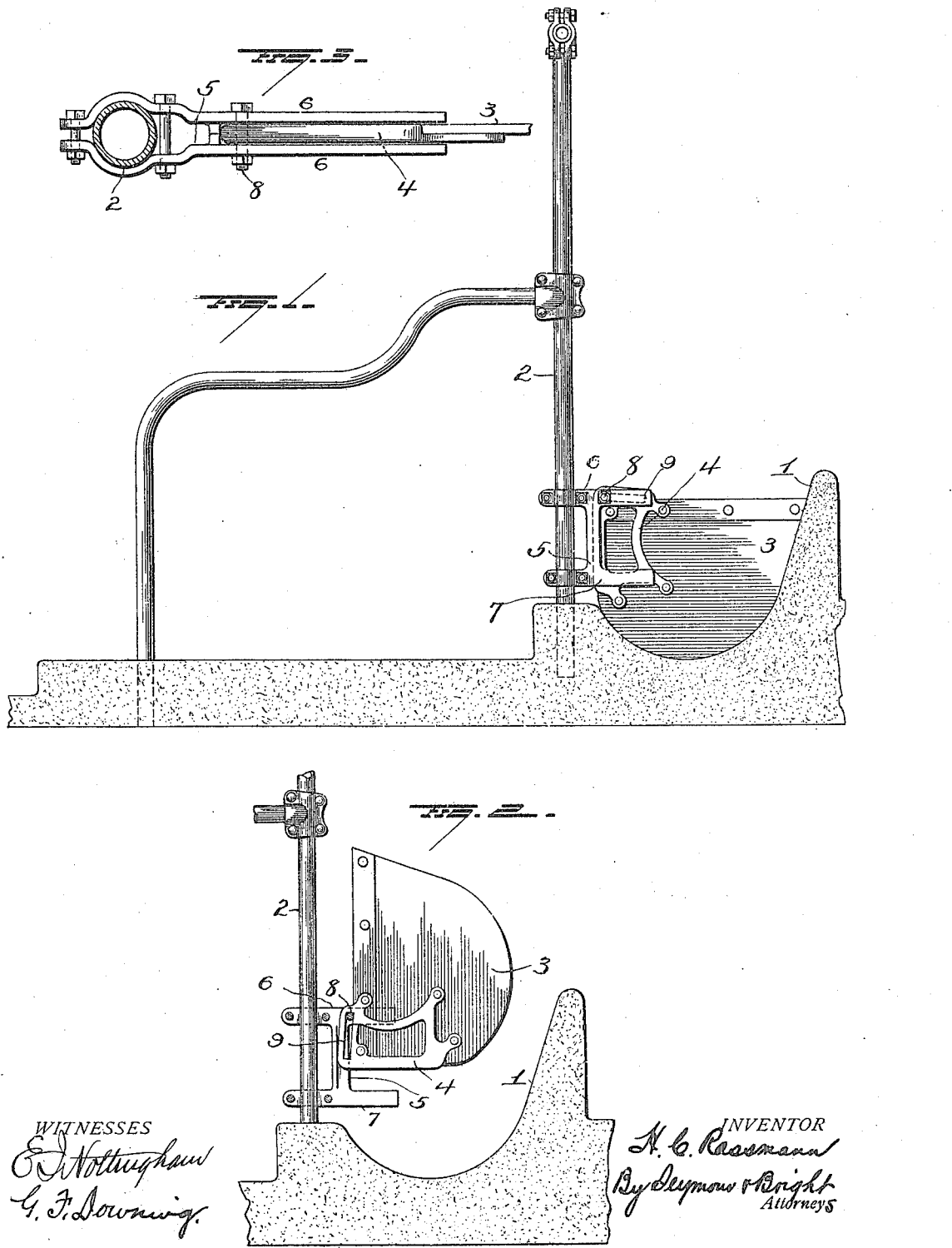

HUGO C. RASSMANN, OF BEAVER DAM, WISCONSIN, ASSIGNOR TO F. RASSMANN MANUFACTURING COMPANY, (INCORPORATED,) OF BEAVER DAM, WISCONSIN.

MANGER-PARTITION CONSTRUCTION.

1,187,783.  Specification of Letters Patent.  Patented June 20, 1916.

Application filed November 23, 1915. Serial No. 63,080.

*To all whom it may concern:*

Be it known that I, HUGO C. RASSMANN, a citizen of the United States, and a resident of Beaver Dam, in the county of Dodge and State of Wisconsin, have invented certain new and useful Improvements in Manger-Partition Construction; and I do hereby declare the following to be a full, clear, and exact description of the invention, such as will enable others skilled in the art to which it appertains to make and use the same.

This invention relates to improvements in manger partition constructions for stalls for animals.

The object of my present invention is to provide simple means for segregating or partitioning portions of a manger from other portions, which means shall be so constructed and arranged that the segregating partition may be raised and held in such position without the use of springs.

With this object in view, the invention consists in certain novel features of construction and combinations of parts as hereinafter set forth and pointed out in the claims.

In the accompanying drawings, Figure 1 is a view of a stall and manger showing the application of my improvements thereto. Fig. 2 is a similar view showing the partition in raised position, and Fig. 3 is a plan view (partly in section) showing the partition construction.

1 represents a manger and 2, one of the uprights of a stall.

It is common practice to provide a manger common to all the stalls of a series and it is desirable that this manger shall be subdivided so that portions thereof shall be segregated from other portions, and thus prevent an animal in one stall from reaching feed intended for animals in other stalls, or to prevent an animal from moving the feed out of reach. I therefore provide partitions in the manger which may serve to subdivide the manger according to the arrangement of the stalls. One of such partitions is indicated at 3 and is made to conform to the contour of the manger.

The partition 3 has secured thereto, a hinge member 4, and the other member of this hinge consists of a bracket 5 clamped to the stall standard 2. The bracket 5 is made with upper and lower parallel arms 6—7 which embrace the hinge member 4 and serve to guide the partition and also to take up any lateral strain to which it may be subjected. This hinge member 4 is pivotally connected with the upper arms 6 of the bracket 5 by means of a hinge pin 8, which latter passes through holes in said arms 6 and through an elongated slot 9 in the upper portion of the hinge member 4.

With the construction above described, the partition may be raised and, by reason of the elongated slot 9, said partition may (when in an upright position) be permitted to drop a limited distance and rest against an intermediate portion of the bracket 5,— the partition being thus secured in its raised position, without the use of springs.

Slight changes might be made in the details of my invention without departing from the spirit thereof or limiting its scope, and hence I do not wish to restrict myself to the precise details herein set forth.

Having fully described my invention what I claim as new and desire to secure by Letters Patent is:

1. The combination with a manger and a support, of a partition for the manger, a bracket secured to the support, a hinge member secured to the partition and having an elongated slot, and a hinge pin passing through said bracket and through the elongated slot of the hinge member, said hinge member disposed to engage the bracket below said hinge pin when the partition is raised.

2. The combination with a manger and a support, of a partition for the manger, a hinge member secured to said partition and having an elongated slot, a bracket secured to said support and having guide arms for the partition, and a pivot pin passing through said bracket and the elongated slot of said hinge member, said hinge member being movable vertically on said hinge pin and adapted to engage the bracket below the hinge pin.

3. The combination with a manger and a support, of a partition for the manger provided with a slotted part near one edge, and a hinge pin passing through the slotted part of the partition and connecting the latter with said support, said support comprising a fixed part affording an abutment for the partition below said hinge pin when the partition is raised whereby said partition may be locked in raised position.

In testimony whereof, I have signed this specification in the presence of two subscribing witnesses.

HUGO C. RASSMANN.

Witnesses:
A. W. LUECK,
H. R. VETTER.

Copies of this patent may be obtained for five cents each, by addressing the "Commissioner of Patents, Washington, D. C."